Patented Apr. 21, 1936

2,038,316

UNITED STATES PATENT OFFICE 2,038,316

PROCESS OF TREATING WATER

Ludwig Rosenstein, San Francisco, Calif., assignor to Shell Development Company, San Francisco, Calif., a corporation of Delaware No Drawing. Application August 30, 1935, Serial No. 38,535

REISSUED

9 Claims. (Cl. 47—58)

This invention relates to a process for avoiding the deposition of calcium carbonate from natural waters at their natural temperatures.

This invention is particularly useful where fertilizing material is delivered to soils by means of natural waters.

According to a recently devised process ammonia is passed into irrigation water in such controlled low amounts that a concentration of ammonia is produced in the water which is so low that injury of the vegetation will not result upon the water coming into contact with the vegetation.

It has been found that where water containing amounts of calcium and bicarbonate is used as a carrier for the ammonia above mentioned, calcium carbonate precipitates because of the reaction:

$$Ca^{++} + HCO_3^- + NH_3 = CaCO_3 + NH_4^+$$
solid

The precipitates so formed from natural waters also contain magnesium carbonate. To avoid repetition the term "calcium" will be used throughout this specification whenever both calcium and magnesium compounds are intended.

The precipitation of calcium carbonate is the factor which limits the amount of ammonia which can be added to the water. For example, with a particular irrigation water (applied to an orange grove) having a calcium concentration of one hundred and twenty parts per million of water and nearly the equivalent amount of bicarbonate, it was found that the ammonia passed into the water had to be limited to twelve and one-half pounds per hour when water was applied at the rate of 225,000 lbs/hr. Any larger introduction of ammonia resulted in the fatal plugging of the pipelines, valves and the like, due to the heavy precipitation of calcium carbonate.

Application of ammonia at the above low rate was totally inadequate to supply the needs of the orange trees. In order to overcome this difficulty in this and similar cases, it was necessary to devise some means of either preventing the precipitation of calcium carbonate or inhibiting its formation for a sufficient time period so that all water would leave the system before precipitation took place, or causing the precipitated particles to be of such physical character that they would be swept out of the system by the flow of water and would not deposit on the surfaces of the pipes and valves forming the distribution system.

It is an object of this invention to devise a method of preventing the deposition of calcium carbonate from waters. It is a further object of this invention to devise a process which will enable ammonia to be added to irrigation water in greater quantities than heretofore.

It is another object of this invention to devise means which will avoid deposition of calcium carbonate produced by the addition of ammonia to water.

In brief, my invention comprises the addition of substances to water which will avoid or delay the precipitation of calcium carbonate or will produce such precipitate in so finely divided a state that it will not adhere to the pipes and valves through which the water is passed.

The following is an example of the use of a precipitation retarding colloid. A hay infusion was made by steeping 100 gms. of alfalfa hay in one liter of water and allowing the hay to remain until bacterial action had progressed to a considerable degree. The liquid containing the infusion was drained off and added in the amount of one cubic inch of liquid to one hundred cubic inches of irrigation water containing calcium bicarbonate in large amounts. After the addition of ammonia to the water it was found that the precipitation of calcium carbonate was delayed for approximately twenty minutes. The precipitate ultimately formed was very fine and non-adherent.

I have found that certain chemicals when added to the water will also retard the precipitation and render the precipitate finely divided and non-adherent.

The following is an example of these latter compositions. To a water containing 142 parts per million of calcium ion, ammonium meta phosphate was added so as to produce a meta phosphate concentration of from 0.50 parts per million to 1 part per million. Thereafter sufficient ammonia was added into the water to produce an ammonia concentration of 500 parts per million. This would normally cause the rapid precipitation of large amounts of calcium carbonate. No precipitation took place for several hours. Instead of ammonia meta phosphates I may use other meta phosphates such as sodium meta phosphates, potassium meta phosphates or I may use meta phosphoric acid.

A significant part of this discovery is the very small amount of the reagent required. It is well known for example, that sodium hexa meta phosphate will react with calcium ions in water to form complex ions so that insoluble calcium compounds such as calcium soaps and calcium carbonate are not formed. The complex ion containing the largest amount of calcium is known to be $$Ca_2(PO_3)_{\overline{6}}\cdot$$

and in the known use of this reagent amounts are used which are equal to or exceed the stoichiometric amount. For example, again considering a water containing 142 parts per million of calcium ion, the addition of 1086 parts per million of sodium hexa meta phosphate would be required in order to combine all the calcium into the complex ion $Ca_2(PO_3)_{\overline{6}}$.

According to my discovery 1/2000 to 1/1000 of this stoichiometric amount is sufficient to accomplish the desired result.

I have also found that other soluble phosphates have the property of affecting the precipitation of calcium carbonate. For example, sodium pyrophosphate, orthophosphoric acid and in general salts of orthophosphoric acid all display the effect of delaying the precipitation of insoluble calcium compounds or of affecting their physical character so that the precipitate is finely divided and non-adherent.

Other organic colloidal substances such as for example, tannic acid, bark extracts, manure infusion and the like also affect the rate of precipitation and physical character of the precipitate favorably for the objective desired.

The treating reagent can be added to the water by any suitable metering device.

Where ammonia is added to the irrigation water from cylinders of anhydrous ammonia, amounts of treating reagent can be added to the water at the same time and in proportion to the ammonia flow by well known devices. It is preferable in the case of meta phosphate or meta phosphoric acid that it be introduced into the water at a point upstream from the point of ammonia injection.

I claim as my invention:

1. Process of retarding the precipitation of calcium carbonate from natural waters comprising adding to said water a soluble meta phosphate in amounts not exceeding one part per million of water whereby upon the addition of alkali to said water precipitation of calcium carbonate is prevented.

2. In a process of supplying increased amounts of fertilizer to soils by means of irrigation water the step of adding a calcium carbonate precipitation retardant to said water in amounts only sufficient to prevent the precipitation of calcium carbonate upon the subsequent addition of ammonia to said water.

3. In a process of supplying increased amounts of fertilizer to soils by means of irrigation water the step of adding meta phosphate to said water in amounts only sufficient to prevent the precipitation of calcium carbonate upon the subsequent addition of ammonia to said water.

4. In a process of supplying increased amounts of fertilizer to soils by means of irrigation water, the steps of adding sodium metaphosphate to a flowing stream of water containing calcium compound in less than the stoichiometric amount required to react with said calcium compound, thereafter passing ammonia into said water and supplying said treated water to the soil.

5. A process for inhibiting natural waters against the precipitation of calcium carbonate upon the addition of alkali consisting in adding to said water a soluble metaphosphate in substantially less than stoichiometric amounts.

6. Process for supplying increased amounts of fertilizer to soils by means of irrigation water comprising adding a calcium carbonate precipitation retardant to water in an amount sufficient to prevent the precipitation of calcium carbonate from said water upon the subsequent addition of ammonia, adding ammonia to said water, thereafter supplying said treated water to the soil.

7. Process for supplying increased amounts of fertilizer to soils by means of irrigation water comprising adding a soluble phosphate to said water in amounts sufficient to prevent the precipitation of calcium carbonate from said water upon the subsequent addition of ammonia, adding ammonia to said water, thereafter supplying said treated water to the soil.

8. Process for supplying increased amounts of fertilizer to soils by means of irrigation water comprising adding a soluble meta phosphate to water in amounts sufficient to prevent the precipitation of calcium carbonate upon the subsequent addition of ammonia, adding ammonia to said water thereafter supplying said treated water to the soil.

9. Process for supplying increased amounts of fertilizer to soils by means of irrigation water comprising adding a member of the group consisting of ammonium meta phosphate, sodium meta phosphate, potassium meta phosphate and meta phosphoric acid to water in amounts sufficient to prevent the precipitation of calcium carbonate upon the subsequent addition of ammonia, adding ammonia to said water thereafter supplying said treated water to the soil.

LUDWIG ROSENSTEIN.